(12) United States Patent
Cao et al.

(10) Patent No.: US 12,142,993 B2
(45) Date of Patent: Nov. 12, 2024

(54) KINETIC ENERGY RECOVERY SYSTEM, METHOD THEREOF AND CUTTING DEVICE

(71) Applicant: ZHEJIANG JINGSHENG M & E CO., LTD, Shaoxing (CN)

(72) Inventors: Jianwei Cao, Shaoxing (CN); Liang Zhu, Shaoxing (CN); Jiabin Lu, Shaoxing (CN); Jinrong Wang, Shaoxing (CN); Wenjie Qiu, Shaoxing (CN); Feng Zhou, Shaoxing (CN); Jiahui Huang, Shaoxing (CN); Changchun Feng, Shaoxing (CN)

(73) Assignee: ZHEJIANG JINGSHENG M & E CO., LTD, Shaoxing (CN)

( * ) Notice: Subject to any disclaimer, the term of this patent is extended or adjusted under 35 U.S.C. 154(b) by 237 days.

(21) Appl. No.: 17/881,613

(22) Filed: Aug. 5, 2022

(65) Prior Publication Data

US 2023/0307986 A1 Sep. 28, 2023

Related U.S. Application Data

(63) Continuation of application No. PCT/CN2022/100791, filed on Jun. 23, 2022.

(30) Foreign Application Priority Data

Mar. 25, 2022 (CN) .......................... 202210317887.1

(51) Int. Cl.
*B60L 58/10* (2019.01)
*B26D 7/06* (2006.01)
*H02K 7/02* (2006.01)

(52) U.S. Cl.
CPC ........... *H02K 7/025* (2013.01); *B26D 7/0625* (2013.01)

(58) Field of Classification Search
CPC ....... H02K 7/025; B26D 7/0625; H02P 27/08; H02P 29/024; B60L 58/10
See application file for complete search history.

(56) References Cited

U.S. PATENT DOCUMENTS

| 4,761,600 A | 8/1988 | D'Atre et al. |
| 11,084,383 B2* | 8/2021 | Petrak ...................... B60L 7/08 |

(Continued)

FOREIGN PATENT DOCUMENTS

| CN | 1709626 A | 12/2005 |
| CN | 101728999 A | 6/2010 |

(Continued)

OTHER PUBLICATIONS

China Office Action of 202210317887.1.
International Search Report of PCT/CN2022/100791.
Search Report of TW111123798.

*Primary Examiner* — Cortez M Cook

(57) ABSTRACT

A kinetic energy recovery system, a kinetic energy recovery method and a cutting device are provided. The kinetic energy recovery system includes a motor controller, an energy storage device and an energy management device. The energy management device is connected to the energy storage device and the motor controller respectively, and the energy management device is configured to feed back braking information of a motor to the motor controller based on energy storage parameters of the energy storage device. The motor controller is configured to control the motor to convert kinetic energy of a rotating member into electrical energy of the energy storage device based on the braking information when the rotating member is in a braking state, and further control the motor to convert the electrical energy of the energy storage device into the kinetic energy of the rotating member when the rotating member is in an operation state.

16 Claims, 3 Drawing Sheets

(56) References Cited

U.S. PATENT DOCUMENTS

| | | | | |
|---|---|---|---|---|
| 2014/0070743 A1* | 3/2014 | Yoshida | ............... | H02P 29/024 |
| | | | | 318/400.22 |
| 2015/0081152 A1* | 3/2015 | Lu | ..................... | B60L 58/10 |
| | | | | 180/53.5 |
| 2017/0093315 A1* | 3/2017 | Ichikawa | ............... | H02P 27/08 |
| 2017/0222589 A1* | 8/2017 | Matsunobu | ............ | H02P 25/08 |

FOREIGN PATENT DOCUMENTS

| | | |
|---|---|---|
| CN | 102126439 A | 7/2011 |
| CN | 102555177 A | 7/2012 |
| CN | 107154755 A | 9/2017 |
| CN | 107444143 A | 12/2017 |
| CN | 113453093 A | 9/2021 |
| CN | 114619508 A | 6/2022 |
| TW | 202103987 A | 2/2021 |
| WO | WO2020033912 A1 | 2/2020 |

* cited by examiner

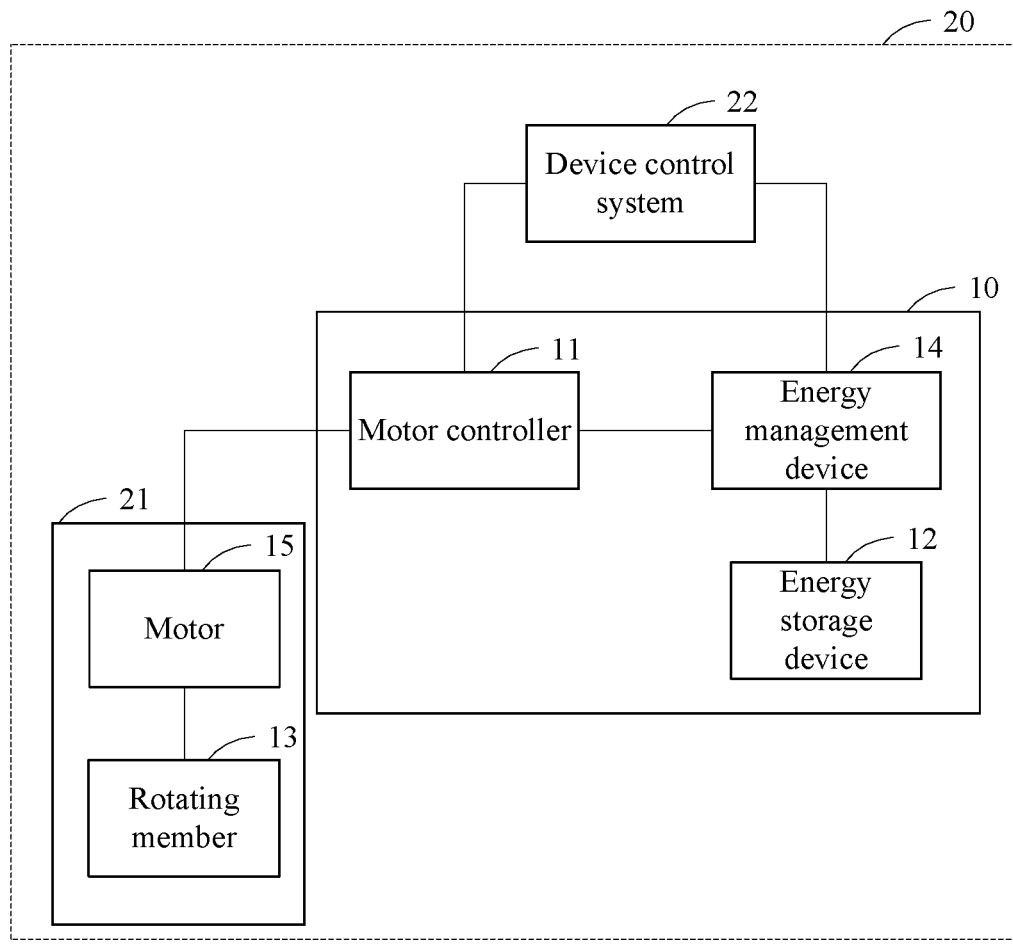

FIG. 3

| Controlling the motor to convert kinetic energy of the at least one rotating member into electrical energy of the energy storage device based on the braking information when the at least one rotating member is in the braking state | ∿ S410 |

↓

| Controlling the motor to convert the electrical energy of the energy storage device into the kinetic energy of the at least one rotating member when the at least one rotating member is in a constant speed state or in an accelerated state | ∿ S420 |

FIG. 4

S510 — The energy management device and the device control system of the slicer control the motor controller when the home roller and the spool for take-up and take-down lines of the slicer are operating in an accelerated state or a constant speed state. So that the motors connected to the home roller and the spool for take-up and take-down lines are in the electric motor state respectively. The motors convert the electrical energy of the energy storage device into the kinetic energy of the home roller and the spool for take-up and take-down lines, and drive the home roller and the spool for take-up and take-down lines to operate S520 — The energy management device and the device control system of the slicer control the motor controller when the home roller and the spool for take-up and take-down lines of the slicer are running at a braking state. So that the motors connected to the home roller and the spool for take-up and take-down lines are in the electric generator state respectively. The motors convert the kinetic energy of the home roller and the spool for take-up and take-down lines into the electrical energy of the energy storage device S530 — During a process of the motor recovering the kinetic energy to the electrical energy, the energy management device feeds back a braking torque of the motor and charging time to the motor controller according to maximum input current, real-time power, maximum stored power and other parameters of the battery S540 — During a process of the motor recovering the kinetic energy to the electrical energy, when a speed of the home roller exceeds a maximum speed allowed by the electrical energy recovery process, the energy management device controls the energy storage device to feed back the electrical energy recovered by the motor to the power grid, or uses the electrical energy for assisting the operation of the slicer

FIG. 5

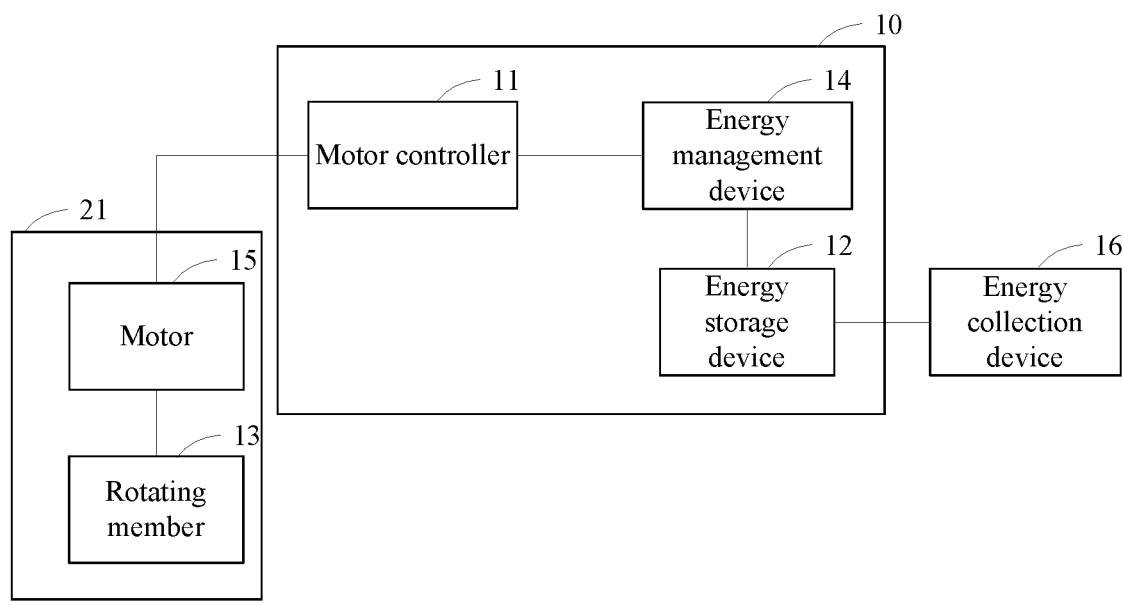

FIG. 6

KINETIC ENERGY RECOVERY SYSTEM, METHOD THEREOF AND CUTTING DEVICE

CROSS-REFERENCE TO RELATED APPLICATIONS

This application is a continuation of international patent application No. PCT/CN2022/100791, filed on Jun. 23, 2022, which itself claims priority to Chinese patent application No. 202210317887.1, filed on Mar. 25, 2022, titled "KINETIC ENERGY RECOVERY SYSTEM, METHOD THEREOF AND CUTTING DEVICE" in the China National Intellectual Property Administration, the content of which is hereby incorporated by reference in its entirety.

TECHNICAL FIELD

The present disclosure relates to a field of a cutting device, and in particular, to a kinetic energy recovery system, a cutting device and a kinetic energy recovery method.

BACKGROUND

At present, a cutting device for cutting silicon, sapphire, silicon carbide and other materials has a problem of excessive energy consumption during operation. Therefore, in a current dual-carbon (peak carbon dioxide emission and carbon neutrality) background, it is necessary to improve an energy utilization rate of the cutting device. When the cutting device is in operation, rotating parts of the cutting equipment tend to run repeatedly, and the problem of excessive energy consumption during operation cannot be alleviated.

For the issue of high energy consumption during the operation of the cutting equipment in the related art, no effective solution has been proposed so far.

SUMMARY

According to various embodiments of the present disclosure, a kinetic energy recovery system, a cutting device and a kinetic energy recovery method are provided.

In a first aspect, the present disclosure provides a kinetic energy recovery system applied to a cutting system. The cutting system includes at least one rotating member and a motor connected to the at least one rotating member, and the kinetic energy recovery system includes a motor controller, an energy storage device, and an energy management device.

The motor controller is connected to the motor and is configured to send a control instruction to operate the motor.

The energy management device is connected to the energy storage device and the motor controller respectively, and the energy management device is configured to feed back braking information of a motor to the motor controller based on energy storage parameters of the energy storage device.

The motor controller is configured to control the motor to convert kinetic energy of the at least one rotating member into electrical energy of the energy storage device based on the braking information when the at least one rotating member is in a braking state, and further control the motor to convert the electrical energy of the energy storage device into the kinetic energy of the at least one rotating member when the at least one rotating member is in a constant speed state or in an accelerated state.

In an embodiment of the present disclosure, the energy storage parameters include power parameters, the energy management device is further configured to feed back a range of a rotating speed of the at least one rotating member in the braking state to the motor controller based on the power parameters.

In an embodiment of the present disclosure, the energy management device is further configured to control the energy storage device to feed back the electrical energy recovered by the motor to a preset energy collection device when the rotating speed of the at least one rotating member is greater than the maximum value in the range of the rotating speed.

In an embodiment of the present disclosure, the energy storage parameters include capacity parameters, the energy management device is further configured to feed back an energy recovery time for a conversion of kinetic energy to electrical energy to the motor controller based on the capacity parameters.

In an embodiment of the present disclosure, the energy storage device includes a battery and a power grid, and the energy management device is connected to the battery and the power grid respectively. The energy management device is further configured to recover the electrical energy converted from the kinetic energy to the power grid after an energy storage of the battery is completed.

In a second aspect, the present disclosure provides a cutting device including a cutting system, a device control system, and the kinetic energy recovery system of the first aspect. The cutting system includes the at least one rotating member and the motor connected to the at least one rotating member. The device control system is connected to the kinetic energy recovery system.

The device control system is configured to control the cutting system to operate based on a battery when a power grid connected to the cutting system fails and the power of the battery connected to the cutting system meets an operating condition of the cutting system.

In an embodiment of the present disclosure, the device control system is further configured to obtain a remaining operating time of the cutting system based on an operating progress of the cutting system, obtain a power supply time of the battery based on the power of the battery, and determine whether the power of the battery meets the operating condition of the cutting system based on the remaining operating time of the cutting system and the power supply time of the battery.

In an embodiment of the present disclosure, the at least one rotating member is arranged corresponding to the energy storage device.

In an embodiment of the present disclosure, at least two rotating members of the cutting system are associated with the same energy storage device.

In a third aspect, the present disclosure further provides a kinetic energy recovery method applied to the kinetic energy recovery system of the first aspect, and the method includes: controlling the motor to convert kinetic energy of the at least one rotating member into electrical energy of the energy storage device based on the braking information when the at least one rotating member is in the braking state, and further controlling the motor to convert the electrical energy of the energy storage device into the kinetic energy of the at least one rotating member when the at least one rotating member is in a constant speed state or in an accelerated state.

Details of one or more embodiments of the present disclosure are presented in the following accompanying drawings and description to make other features, purposes and advantages of the present disclosure more concise and understandable.

BRIEF DESCRIPTION OF THE DRAWINGS

To describe and illustrate embodiments and/or examples of the present disclosure made public here better, reference may be made to one or more of the figures. The additional details or embodiments used to describe the figures should not be construed as limiting the scope of any of the present disclosure, the embodiments and/or examples currently described, and the best model of the present disclosure as currently understood.

FIG. 3 is a connection diagram of a kinetic energy recovery system and a device control system in an embodiment of the present disclosure.

FIG. 4 is a flow diagram of a kinetic energy recovery method in an embodiment of the present disclosure.

FIG. 5 is a flow diagram of a kinetic energy recovery method applied to a slicer in an embodiment of the present disclosure.

FIG. 6 is a connection diagram of a kinetic energy recovery system and an energy collection device in an embodiment of the present disclosure.

DETAILED DESCRIPTION

In order to understand purposes, technical solutions and advantages of the present disclosure, the present disclosure is described and illustrated below accompanying with drawings and embodiments of the present disclosure.

Unless otherwise defined, all technical and scientific terms used herein have the same meaning as a skilled person in the art would understand. The term "one", "a", "an", "the", "these" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods and systems, and products or devices including a series of steps or modules (units) are not limited to listed steps or modules (units), but may include steps or modules (units) not listed, or may include other steps or modules (units) inherent in those processes, methods, products or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. Normally, the character "/" indicates that the objects associated with each other are in an "or" relationship. The terms "first", "second", "third", etc. involved in the present disclosure are only configured for distinguishing similar objects, and do not represent a specific order of the objects.

Figure 1:
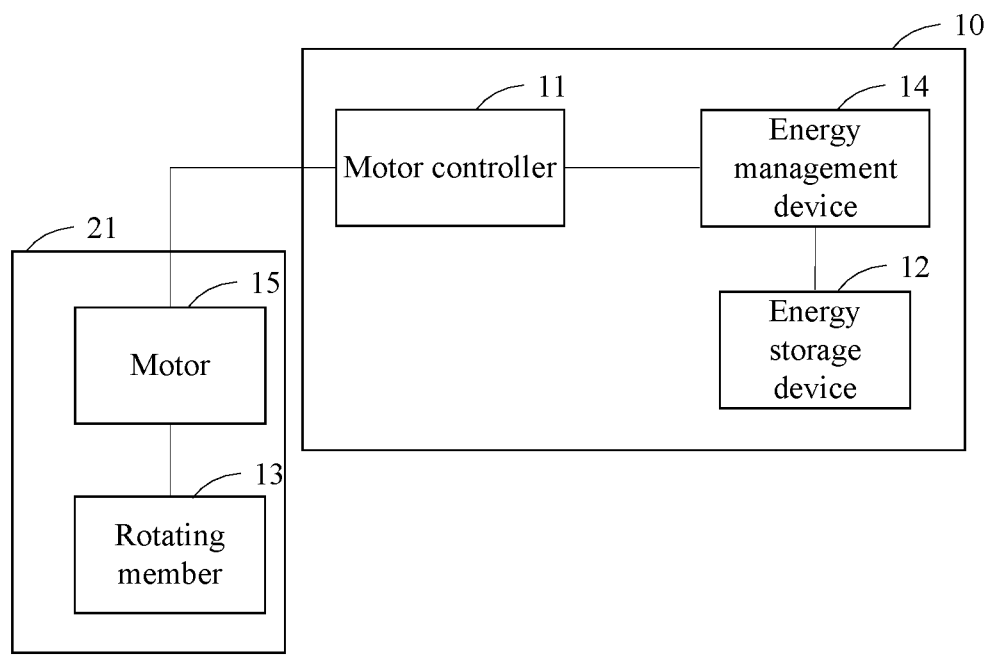
FIG. 1 is a schematic diagram of a kinetic energy recovery system in an embodiment of the present disclosure.

An embodiment of the present disclosure provides a kinetic energy recovery system 10 applied to a cutting system 21. The cutting system 21 in the present embodiment can include at least one rotating member 13 and a motor 15 connected to the at least one rotating member 13. FIG. 1 is a schematic diagram of the kinetic energy recovery system 10 in the present embodiment. As shown in FIG. 1, the kinetic energy recovery system 10 can include a motor controller 11, an energy storage device 12, and an energy management device 14. The motor controller 11 of the kinetic energy recovery system 10 can be connected to the motor 15 of the cutting system 21, and can be configured to send a control instruction to operate the motor 15. The energy management device 14 is connected to the energy storage device 12 and the motor controller 11 respectively, and the energy management device 14 is configured to feed back braking information of the motor 15 to the motor controller 11 based on energy storage parameters of the energy storage device 14. The motor controller 11 is configured to control the motor 15 to convert kinetic energy of the at least one rotating member 13 into electrical energy of the energy storage device 12 based on the braking information when the rotating member 13 is in a braking state, and further control the motor 15 to convert the electrical energy of the energy storage device 12 into the kinetic energy of the at least one rotating member 13 when the at least one rotating member 13 is in a constant speed state or in an accelerated state.

Exemplarily, the cutting system 21 may be a slicer for cutting silicon, sapphire, silicon carbide and other materials. The at least one rotating member 13 can be a home roller and a spool for take-up and take-down lines of the slicer. The motor 15 can be an electromagnetic device that can realize electric energy conversion or transmission based on a principle of electromagnetic induction, and can mainly be configured to generate a driving torque and then use the driving torque as power sources of electrical appliances or various mechanical components of the electrical appliances. Currently, motors can be divided into DC (direct current) motors, stepper motors, unidirectional asynchronous motors, and permanent magnet motors according to types thereof. Alternatively, the motor 15 applied to the cutting system 21 in the present disclosure can be a permanent magnet motor, and an operation state of the motor 15 can be switched between an electric motor state and an electric generator state. When the motor 15 is in the electric motor state, a rotating magnetic field can be generated by an energized coil, and can act on a rotor to form a rotational torque with a magnetoelectric power, which can realize the conversion of electrical energy to kinetic energy, and then drive the rotating member 13 to operate. When the motor 15 is in the electric generator state, kinetic energy generated from a rotor shaft of the motor 15 can be converted into electrical energy in a stator winding coil of the motor 15 by a relative movement of a rotor magnetic field and the stator winding coil of the motor 15 based on the principle of electromagnetic induction, which can realize the conversion of kinetic energy to electrical energy, and then energy storage of the energy storage device 12 can be completed. The energy storage device 12 can be a battery or a power grid, which can be electrically connected to the cutting system 21. For example, the battery can be provided in an electrical cabinet of the cutting system 21 to store energy, or the cutting system 21 can be connected to the power grid for operation. Specifically, the energy management device 14 can be an electronic device connected to the energy storage device 12 and deployed with a processing chip. The energy management device 14 can acquire attribute information of the energy storage device 12, and feed back braking information of the motor 15 to the motor controller 11 based on a conversion relationship between the attribute information of the energy storage device 12 and motion states of the at least one rotating member 13 driven by the motor 15. The braking information of the motor 15 can be parameter information that can be used by the motor 15 to decelerate the rotating member 13 under control of the motor controller 11.

During an operation of the cutting system 21, the motion states of the at least one rotating member 13 of the cutting system 21 can include a forward accelerated state, a constant speed state, a deceleration to zero and then reverse accelerated state, a constant speed state, and a deceleration to zero state, and a change period of the motion states can be constant. When the at least one rotating member 13 is in the accelerated state, the motor 15 needs to provide a relatively greater torque along a rotating direction of the at least one rotating member 13, and when the at least one rotating member 13 is in the constant speed state, the motor 15 needs to provide a relatively less torque along the rotating direction of the at least one rotating member 13. When the at least one rotating member 13 is in a deceleration to zero state (i.e. a braking state), the motor 15 needs to provide an additional torque opposite to the rotating direction of the at least one rotating member 13 based on resistance of the at least one rotating member 13 itself, so as to realize the braking of the at least one rotating member 13. The operation state of the motor 15 can be associated with the motion states of the at least one rotating member 13. When the at least one rotating member 13 is in the braking state, in order to improve an utilization rate of the kinetic energy of the at least one rotating member 13, the kinetic energy generated by the at least one rotating member 13 can be converted into electrical energy of the energy storage device 12 by the motor 15. When the at least one rotating member 13 is in the accelerated state or the constant speed state, electrical energy recovered by the energy storage device 12 can be converted into kinetic energy to drive the at least one rotating member 13 to operate.

Furthermore, the energy storage parameters can include power parameters and capacity parameters. For example, the energy storage parameters can be power parameters such as a maximum charging voltage and a maximum charging current allowed in the battery, and capacity parameters such as a maximum storage capacity and remaining capacity of the battery. Exemplarily, a range of a rotating speed of the at least one rotating member 13 during a kinetic energy recovery process can be determined based on the power parameters of the battery, so as to avoid a battery damage caused by excessive charging voltage or excessive charging current. For another example, an allowable energy recovery time can be determined based on the capacity parameters of the battery, so as to avoid a battery damage caused by overcharging.

In addition, the kinetic energy recovery system 10 can provide two channels for the kinetic energy recovery process of the cutting system 21, that is, the electrical energy converted from the kinetic energy of the cutting system 21 can be recovered to the battery or to the power grid. Alternatively, the energy management device 14 can recover the electrical energy converted from the kinetic energy to the battery, and recover the electrical energy to the power grid after the battery is fully stored. Furthermore, in order to improve safety and stability of the energy storage device 12, after a rotating speed of the at least one rotating member 13 is greater than the maximum value in a range of the rotating speed allowed by the energy recovery process, the electrical energy converted from the kinetic energy can be recovered to the power grid, or a usage of battery power can be increased.

The kinetic energy recovery system 10 of the present disclosure can realize detection of the energy storage parameters of the energy storage device 12 based on the energy management device 14 connected to the energy storage device 12. So that an operation control of the motor 15 can be realized based on a conversion relationship between the energy storage parameters and the motion states of the at least one rotating member 13 of the cutting system 21. An operation control that meet operation requirements of the cutting system 21 can be realized under a condition of avoiding damage to the energy storage device 12. Therefore, the kinetic energy recovery system 10 of the present disclosure can realize the energy recovery that meet the operation requirements of the cutting system 21. In addition, since the at least one rotating member 13 of the cutting system 21 is in a state of periodic cyclic motion, the operation state of the motor 15 can also correspond to motion states of the at least one rotating member 13, and be in a state of periodic change. So that in the kinetic energy recovery system 10 applied to a cutting system 21, the motion states of the at least one rotating member 13 can be determined by the operation state of the motor 15 itself, and the motor 15 can be controlled to complete a switch between the kinetic energy and the electrical energy at a fixed time point.

In the above kinetic energy recovery system 10, the energy management device 14 can be configured to feed back braking information of the motor 15 to the motor controller 11 based on energy storage parameters of the energy storage device 12 to control an operation of the motor 15. The motor controller 11 can be configured to control the motor 15 to convert the kinetic energy of the at least one rotating member 13 into the electrical energy of the energy storage device 12 based on the braking information when the at least one rotating member 13 is in the braking state, and further control the motor 15 to convert the electrical energy of the energy storage device 12 into the kinetic energy of the at least one rotating member 13 when the at least one rotating member 13 is in the constant speed state or in the accelerated state. The above kinetic energy recovery system 10 can realize a mutual conversion of the kinetic energy and the electrical energy when the cutting system 21 is in operation, thereby improving energy utilization efficiency, reducing power consumption of the cutting system 21, and further reducing energy consumption of the cutting system 21.

In an embodiment, in the above kinetic energy recovery system 10, the energy storage parameters can include power parameters, the energy management device 14 can be configured to feed back a range of a rotating speed of the at least one rotating member 13 in the braking state to the motor controller 11 based on the power parameters.

Specifically, the energy management device 14 can acquire the power parameters such as the maximum charging voltage and the maximum charging current allowed in the energy storage device 12, and feed back the range of the rotating speed of the at least one rotating member 13 in the braking state to the motor controller 11 based on a conversion relationship between the power parameters and the rotating speed of the at least one rotating member 13. The motor controller 11 can control the motor 15 to drive the at least one rotating member 13 to operate based on the range of the rotating speed of the at least one rotating member 13, so as to control the rotating speed of the at least one rotating member 13 to be within the range of the rotating speed. For example, when 70% or less of the maximum value in the range of the rotating speed of the at least one rotating member 13 is a safe charging range of the battery, the motor controller 11 can control the motor 15 to drive the rotating member 13 to operate in a rotating speed lower than 70% of the maximum value in the range of the rotating speed of the at least one rotating member 13, so as to avoid damage to the battery caused by excessive charging voltage or current. By feeding back the range of the rotating speed of the at least one rotating member 13 in the braking state to the motor controller 11 based on the power parameters, the kinetic energy recovery of the cutting system 21 can be realized on a premise of improving safety of the energy storage device 12, thereby improving the energy utilization efficiency of the cutting system 21.

Furthermore, as shown in FIG. 6, in an embodiment, in the above kinetic energy recovery system 10, the energy management device 14 can be further configured to control the energy storage device 12 to feed back the electrical energy recovered by the motor 15 to a preset energy collection device 16 when the rotating speed of the at least one rotating member 13 is greater than the maximum value in the range of the rotating speed.

Taking the home roller as an example, there is a conversion relationship between a power-generation torque and angular velocity of the home roller and charging power of the battery. In a case that maximum charging power of the battery is limited by properties of the battery itself, assuming that the torque of the home roller is constant when the home roller is in the braking state, the maximum value of the angular velocity of the home roller can be limited according to the properties of the battery itself. The angular velocity of the home roller can change in an inverse proportion to the torque when the torque of the home roller changes according to a certain law in the braking state. Therefore, it is possible to avoid overcharging the energy storage device 12 by limiting the range of the rotating speed of the at least one rotating member 13. The energy storage device 12 can feed back the electrical energy recovered by the motor 15 to a preset energy collection device 16 when the rotating speed of the rotating member 13 is greater than the maximum value in the range of the rotating speed, thereby improving safety of the energy recovery process to the energy storage device 12. The energy collection device 16 may be the power grid, or other devices for assisting the operation of the cutting system 21.

In an embodiment, the energy storage parameters can include capacity parameters, the energy management device 14 is further configured to feed back an energy recovery time for a conversion of kinetic energy to electrical energy to the motor controller 11 based on the capacity parameters.

Specifically, the energy management device 14 can acquire the capacity parameters such as the maximum storage capacity and remaining capacity in the energy storage device 12, and determine a charging duration of the energy storage device 12 based on the capacity parameters, thereby controlling the energy recovery time for the conversion of the kinetic energy to the electrical energy by the motor 15. A control of a charge amount of the energy storage device 12 can be realized by setting the allowable energy recovery time, so as to avoid the damage to the energy storage device 12 caused by overcharging.

In an embodiment, in the above kinetic energy recovery system 10, the energy storage device 12 can include a battery and a power grid, the energy management device 14 can be connected to the battery and the power grid respectively, and the energy management device 14 can be further configured to recover the electrical energy converted from the kinetic energy to the power grid after an energy storage of the battery is completed.

The electrical energy converted from the kinetic energy can be preferentially recovered to the battery, and the battery can be provided in the electrical cabinet of the cutting system 21. Then the electrical energy can be recovered to the power grid connected to the cutting system 21 after energy storage is full in the battery. When the power grid fails to carry the power due to abnormal conditions such as power failure, the recovered electrical energy can be used for assisting the operation of other devices, the recovered electrical energy can be used for lighting when the motor 15 is additionally connected to a light source. By providing two energy recovery channels for the cutting system 21, the cutting system 21 can continue to operate under power supply of the battery when power failure exists in the power grid, thereby improving running stability of the cutting system 21.

Figure 2:
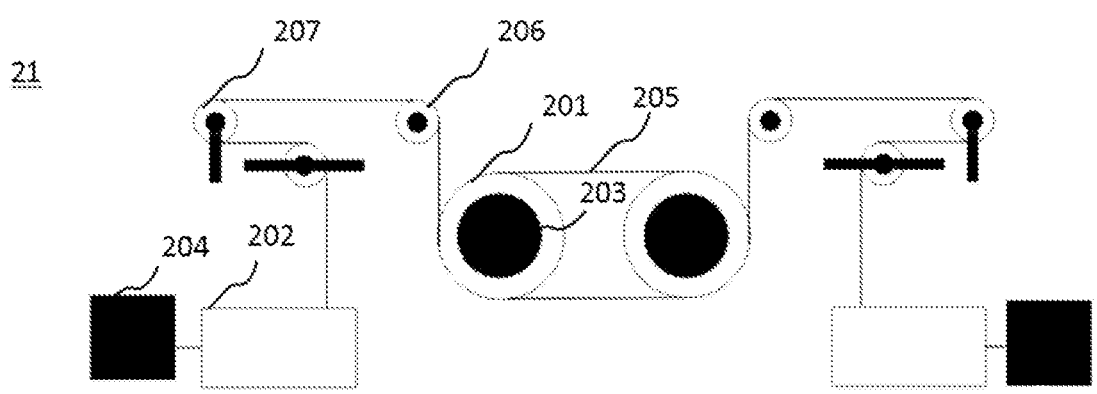
FIG. 2 is a schematic diagram of a cutting system in an embodiment of the present disclosure.

The present embodiment further provides a cutting device 20, FIG. 2 is a schematic diagram of the cutting system 21 in the present embodiment, and FIG. 3 is a connection diagram of the kinetic energy recovery system and a device control system 22 in the present embodiment. Referring to FIG. 2 and FIG. 3, the cutting device 20 can include a cutting system 21, a device control system 22, and the kinetic energy recovery system 10 of any one of the embodiments mentioned above. The device control system 22 can be configured to control the cutting system 21 to operate based on a battery when a power grid connected to the cutting system 21 fails and the power of the battery connected to the cutting system 21 meets an operating condition of the cutting system 21.

The cutting system 21 can include a plurality of different rotating members 13, and the plurality of rotating members 13 can specifically be the home roller 201 and the spool 202 for take-up and take-down lines of the slicer. The rotating members 13 can be connected to the motor 15 by a transmission mechanism, and a specific connection is not limited here. For example, the rotating members 13 can be directly connected to the motor 15 by a coupling, or can be connected to the motor 15 in other ways. Exemplarily, the home roller 201 can be connected to a first motor 203, and the first motor 203 can drive the home roller 201 to operate. The spool 202 for take-up and take-down lines can be connected to a second motor 204, and the second motor 204 can drive the spool 202 for take-up and take-down lines to operate. The first motor 203 and the second motor 204 can be motors of the same model. The operation state of the spool 202 for take-up and take-down lines can be synchronized with that of the home roller 201. Specifically, the spool 202 for take-up and take-down lines and the home roller 201 can be connected by a wire. A tangential speed of the spool 202 for take-up and take-down lines and that of the home roller 201 can be always the same as that of the wire during operation, so as to avoid stretching of the wire. Therefore, the operation state of the spool 202 for take-up and take-down lines can be synchronized with that of the home roller 201 during the accelerated state, the constant speed state, and the braking state of the rotating members 13. Additionally, the cutting system 21 can further include a diamond wire 205, a guide pulley 206, and a tension pulley 207. The guide pulley 206 and the tension pulley 207 under a traction of the wire can cooperate with the home roller 201 and the wheel 202 for take-up and take-down lines under the driving of the motor 15 to complete a slicing process synchronously.

Each motor 15 can be corresponding to a motor controller 11 separately, or a plurality of motors 15 can be connected to a motor controller 11 together, no specific qualification will be made herein. Exemplarily, each motor 15 can be connected to a motor controller 11, and the device control system 22 can send signals to the motor controller 11 to ensure that the motor controller 11 can control the operation of the motor 15. Specifically, the device control system 22 can be any electronic device provided with a processing chip. The device control system 22 can be connected to the energy management device 14, and control the operation of the cutting system 21 based on energy recovery information fed back by the energy management device 14.

Furthermore, the operating condition of the cutting system 21 can specifically be a battery power condition that can support the cutting system 21 to complete a current operation. In a case that the time required for the cutting system 21 to complete the current operation is compared with power supply time of the battery and it is determined that the power of the battery connected to the cutting system 21 supports the cutting system 21 to complete the current operation, then it is determined that the power of the battery satisfies the operating condition of the cutting system 21. In a case that the power grid fails, when the power of the battery meets the operating condition of the cutting system 21, the battery can be used to power the cutting system 21 and support the cutting system 21 to complete the current operation, and when the power of the battery does not meet the operating condition of the cutting system 21, the cutting system 21 can be stopped stably.

In the above cutting device 20, the kinetic energy recovery system 10 of the above-mentioned embodiment can complete the conversion of the kinetic energy and the electric energy during operation, thereby improving the energy utilization efficiency, reducing the power consumption of the cutting device 20, and further reducing the energy consumption of the cutting device 20.

Furthermore, in an embodiment, the device control system 22 of the above cutting device 20 can be further configured to obtain a remaining operating time of the cutting system 21 based on an operating progress of the cutting system 21, obtain a power supply time of the battery based on the power of the battery, and determine whether the power of the battery meets the operating condition of the cutting system 21 based on the remaining operating time of the cutting system 21 and the power supply time of the battery.

Specifically, the device control system 22 can determine the remaining operating time of the cutting system 21 to complete the current operation according to the operating progress of the cutting system 21 fed back by an encoder in real time or periodically. Exemplarily, during a process of the slicer using a feed component to drive short silicon rods to move to perform the slicing operation, when the power grid fails, the device control system 22 can obtain the progress of slicing process performed by the slicer via the descending information of the feed component fed back by the encoder in real time or periodically. Then a remaining time of the current slicing operation completed by the slicer can be obtained by the progress of slicing process and a duration of the slicing process completed by the slicer in the past, and the remaining time of the current slicing operation can be the above-mentioned remaining operating time. In addition, the device control system 22 can obtain a power supply time of the battery based on the power fed back by the battery. When the power supply time of the battery exceeds the remaining operating time in a preset ratio, the device control system 22 can control the cutting system 21 to operate based on the power supply of the battery. Alternatively, for the slicer, in a case that the power supply time of the battery is 1.3 times greater than the remaining operating time, the device control system 22 can control the cutting system 21 to operate based on the power supply of the battery.

Additionally, in an embodiment, the rotating members 13 can be arranged corresponding to the energy storage devices 12 respectively. By arranging the rotating members 13 corresponding to the energy storage devices 12 respectively, the motor 15 can be used to realize a direct energy conversion between the rotating members 13 and the energy storage devices 12 corresponding to the rotating members 13, thereby improving the energy utilization efficiency of the rotating members 13.

Additionally, in an embodiment, at least two rotating members 13 of the cutting system 21 can be associated with the same energy storage device 12. By associating different rotating members 13 with the same energy storage device 12, the energy conversion between the energy storage device 12 and different rotating members 13 can be realized based on the energy management device 14, the motor controller 11, and the motor 15, thereby improving the energy utilization efficiency of the entire cutting system 21, and reducing a deployment cost of the energy storage device 12.

In an embodiment, the present disclosure can provide a kinetic energy recovery method applied to the kinetic energy recovery system in the above-mentioned embodiment. FIG. 4 is a flow diagram of the kinetic energy recovery method. As shown in FIG. 4, the method can include the following steps:

Step 410, controlling the motor to convert kinetic energy of the at least one rotating member into electrical energy of the energy storage device based on the braking information when the at least one rotating member is in the braking state.

Step 420, controlling the motor to convert the electrical energy of the energy storage device into the kinetic energy of the at least one rotating member when the at least one rotating member is in a constant speed state or in an accelerated state.

Through the above steps, the mutual conversion of the kinetic energy and the electric energy during the operation of the cutting device 21 can be realized, thereby improving the energy utilization efficiency, reducing the power consumption of the cutting device 21, and further reducing the energy consumption of the cutting device 21.

It should be noted that the steps shown in the above flow or the flow diagram of the accompanying drawings can be executed in a computer system that stores such as a set of computer-executable instructions. Although a logical sequence is shown in the flow diagram, in some cases, steps shown or described may be performed in an order different from that herein. For example, step 420 may be performed before step 410.

The present embodiment will be described and illustrated below in alternative embodiments.

FIG. 5 is a flow diagram of the kinetic energy recovery method applied to the slicer in an alternative embodiment. As shown in FIG. 5, the method can include the following steps:

Step 510, the energy management device and the device control system of the slicer control the motor controller when the home roller and the spool for take-up and take-down lines of the slicer are operating in an accelerated state or a constant speed state. So that the motors connected to the home roller and the spool for take-up and take-down lines are in the electric motor state respectively. The motors convert the electrical energy of the energy storage device into the kinetic energy of the home roller and the spool for take-up and take-down lines, and drive the home roller and the spool for take-up and take-down lines to operate.

Step 520, the energy management device and the device control system of the slicer control the motor controller when the home roller and the spool for take-up and take-down lines of the slicer are running at a braking state. So that the motors connected to the home roller and the spool for take-up and take-down lines are in the electric generator state respectively. The motors convert the kinetic energy of the home roller and the spool for take-up and take-down lines into the electrical energy of the energy storage device.

Step 530, during a process of the motor recovering the kinetic energy to the electrical energy, the energy management device feeds back a braking torque of the motor and charging time to the motor controller according to maximum input current, real-time power, maximum stored power and other parameters of the battery.

Step 540, during a process of the motor recovering the kinetic energy to the electrical energy, when a speed of the home roller exceeds a maximum speed allowed by the electrical energy recovery process, the energy management device controls the energy storage device to feed back the electrical energy recovered by the motor to the power grid, or uses the electrical energy for assisting the operation of the slicer.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A kinetic energy recovery system applied to a cutting system, the cutting system comprising at least one rotating member and a motor connected to the at least one rotating member, wherein the kinetic energy recovery system comprises a motor controller, an energy storage device, and an energy management device, the motor controller is connected to the motor and is configured to send a control instruction to operate the motor;

the energy management device is connected to the energy storage device and the motor controller respectively, and the energy management device is configured to feed back braking information of the motor to the motor controller based on energy storage parameters of the energy storage device;

the motor controller is configured to control the motor to convert kinetic energy of the at least one rotating member into electrical energy of the energy storage device based on the braking information when the at least one rotating member is in a braking state, and further control the motor to convert the electrical energy of the energy storage device into the kinetic energy of the at least one rotating member when the at least one rotating member is in a constant speed state or in an accelerated state; and the energy storage parameters comprise capacity parameters, the energy management device is further configured to feed back an energy recovery time for a conversion of kinetic energy to electrical energy to the motor controller based on the capacity parameters.

2. The kinetic energy recovery system of claim 1, wherein the energy storage parameters comprise power parameters, the energy management device is further configured to feed back a range of a rotating speed of the at least one rotating member in the braking state to the motor controller based on the power parameters.

3. The kinetic energy recovery system of claim 2, wherein the energy management device is further configured to control the energy storage device to feed back the electrical energy recovered by the motor to a preset energy collection device when the rotating speed of the at least one rotating member is greater than the maximum value in the range of the rotating speed.

4. The kinetic energy recovery system of claim 1, wherein the energy storage device comprises a battery and a power grid, the energy management device is connected to the battery and the power grid respectively, and the energy management device is further configured to recover the electrical energy converted from the kinetic energy to the power grid after an energy storage of the battery is completed.

5. A cutting device, comprising a cutting system, a device control system, and the kinetic energy recovery system of claim 1, wherein the cutting system comprises the at least one rotating member and the motor connected to the at least one rotating member;

the device control system is configured to control the cutting system to operate based on a battery when a power grid connected to the cutting system fails and the power of the battery connected to the cutting system meets an operating condition of the cutting system.

6. The cutting device of claim 5, wherein the device control system is further configured to obtain a remaining operating time of the cutting system based on an operating progress of the cutting system, obtain a power supply time of the battery based on the power of the battery, and determine whether the power of the battery meets the operating condition of the cutting system based on the remaining operating time of the cutting system and the power supply time of the battery.

7. The cutting device of claim 5, wherein the at least one rotating member is arranged corresponding to the energy storage device.

8. The cutting device of claim 5, wherein at least two rotating members of the cutting system are associated with the same energy storage device.

9. The cutting device of claim 5, wherein the energy storage parameters comprise power parameters, the energy management device is further configured to feed back a range of a rotating speed of the at least one rotating member in the braking state to the motor controller based on the power parameters.

10. The cutting device of claim 9, wherein the energy management device is further configured to control the energy storage device to feed back the electrical energy recovered by the motor to a preset energy collection device when the rotating speed of the at least one rotating member is greater than the maximum value in the range of the rotating speed.

11. The cutting device of claim 5, wherein the energy storage parameters comprise capacity parameters, the energy management device is further configured to feed back an energy recovery time for a conversion of kinetic energy to electrical energy to the motor controller based on the capacity parameters.

12. The cutting device of claim 5, wherein the energy storage device comprises a battery and a power grid, the energy management device is connected to the battery and the power grid respectively, and the energy management device is further configured to recover the electrical energy converted from the kinetic energy to the power grid after an energy storage of the battery is completed.

13. A kinetic energy recovery method applied to the kinetic energy recovery system of claim 1, wherein the method comprises:

the motor controller controlling the motor to convert kinetic energy of the at least one rotating member into electrical energy of the energy storage device based on the braking information when the at least one rotating member is in the braking state, and further controlling the motor to convert the electrical energy of the energy storage device into the kinetic energy of the at least one rotating member when the at least one rotating member is in a constant speed state or in an accelerated state; and the energy management device feeding back an energy recovery time for a conversion of kinetic energy to electrical energy to the motor controller based on the capacity parameters.

14. The kinetic energy recovery method of claim 13, wherein the energy storage parameters comprise power parameters, and the method further comprises: the energy management device feeding back a range of a rotating speed of the at least one rotating member in the braking state to the motor controller based on the power parameters.

15. The kinetic energy recovery method of claim 14, further comprising: the energy management device controlling the energy storage device to feed back the electrical energy recovered by the motor to a preset energy collection device when the rotating speed of the at least one rotating member is greater than the maximum value in the range of the rotating speed.

16. The kinetic energy recovery method of claim 13, wherein the energy storage device comprises a battery and a power grid, the energy management device is connected to the battery and the power grid respectively, and the method further comprises: the energy management device recovering the electrical energy converted from the kinetic energy to the power grid after an energy storage of the battery is completed.

* * * * *